United States Patent
Werner et al.

(10) Patent No.: US 10,262,209 B2
(45) Date of Patent: Apr. 16, 2019

(54) METHOD FOR ANALYZING VIDEO DATA

(71) Applicant: L-1 Identity Solutions AG, Bochum (DE)

(72) Inventors: Martin Werner, Hemer (DE); Brian Scott Swann, Arlington, VA (US)

(73) Assignee: L-1 IDENTITY SOLUTIONS AG, Bochum (DE)

( * ) Notice: Subject to any disclaimer, the term of this patent is extended or adjusted under 35 U.S.C. 154(b) by 44 days.

(21) Appl. No.: 15/599,108

(22) Filed: May 18, 2017

(65) Prior Publication Data

US 2017/0337426 A1 Nov. 23, 2017

(30) Foreign Application Priority Data

May 18, 2016 (EP) .................................... 16170194

(51) Int. Cl.
*G06K 9/00* (2006.01)
(52) U.S. Cl.
CPC ..... *G06K 9/00744* (2013.01); *G06K 9/00288* (2013.01); *G06K 9/00369* (2013.01); *G06K 9/00771* (2013.01); *G06K 2009/00738* (2013.01)
(58) Field of Classification Search
CPC ........... G06K 9/00369; G06K 9/00744; G06K 9/00771; G06K 9/00288; G06K 2009/00738
USPC ....................................................... 382/103
See application file for complete search history.

(56) References Cited

U.S. PATENT DOCUMENTS

| | | | | |
|---|---|---|---|---|
| 2004/0117638 A1* | 6/2004 | Monroe | ............. | G06K 9/00221 713/186 |
| 2004/0243588 A1* | 12/2004 | Tanner | ............... | G06F 17/30545 |
| 2011/0107374 A1* | 5/2011 | Roberts | ............. | H04N 5/44543 725/46 |
| 2013/0266193 A1* | 10/2013 | Tiwari | ............... | G06K 9/00771 382/115 |

OTHER PUBLICATIONS

European Search Report for European Application No. EP 16170194 dated Nov. 30, 2016.
Ryoan Layne et al: "Investigating Open-World Person Re-Identificaton Using a Drone", Network and Parallel Computing, vol. 8927, Sep. 6, 2014 (Sep. 6, 2014), XP55324321, Cham, ISSN: 0302-9743, ISBN: 978-3-642-34690-3.

(Continued)

*Primary Examiner* — Gregory F Cunningham
(74) *Attorney, Agent, or Firm* — Moore & Van Allen PLLC; Henry B. Ward, III

(57) ABSTRACT

The invention provides a method of analyzing video data comprising the steps of recording the video data using one or more video recording devices; analyzing at least one video frame of the video data to extract identification information regarding a specific object of interest that is comprised in a watch list of a plurality of objects of interest, the watch list including at least one entry for each of the plurality of objects of interest; computing a matching value by comparing the extracted identification information with predetermined identification information of the specific object of interest; and storing object data and the matching value as an additional entry in the watch list in association with the specific object of interest.

19 Claims, 2 Drawing Sheets

| person rowindex | $P_1$ | $P_2$ | ••• | $P_m$ |
|---|---|---|---|---|
| 1 | $M_{11}; I_{11}$ | $M_{12}; I_{12}$ | | $M_{1m}; I_{1m}$ |
| 2 | $M_{21}; I_{21}$ | $M_{22}; I_{22}$ | | $M_{2m}; I_{2m}$ |
| 3 | $M_{31}; I_{31}$ | / | | $M_{3m}; I_{3m}$ |
| ⋮ | | | | |
| n | $M_{n1}; I_{n1}$ | | | / |

(56) References Cited

OTHER PUBLICATIONS

Ankt Jain: "A watch-list based classification system", Jan. 1, 2013 (Jan. 1, 2013), XP55324322, ISBN: 978-1-303-49899-2, Retrieved from the Internet: URL:http://drum.lib.umd.edu/bitstream/handle/1903/14684/Jain_umd_0117N_14611.pdf.
Dmitry Gorodnichy et al: "Target-based evaluation of face recognition technology for video surveillance applications", 2014 IEEE Symposium on Computational Intelligence in Biometrics and Identity Management (CIBIM), Dec. 1, 2014 (Dec. 1, 2014), pp. 110-117, XP55324437, DOI: 10.1109/CIBIM.2014.7015451, ISBN: 978-1-4799-4533-7.

* cited by examiner

| rowindex \ person | $P_1$ | $P_2$ | ... | $P_m$ |
|---|---|---|---|---|
| 1 | $M_{11}; I_{11}$ | $M_{12}; I_{12}$ | | $M_{1m}; I_{1m}$ |
| 2 | $M_{21}; I_{21}$ | $M_{22}; I_{22}$ | | $M_{2m}; I_{2m}$ |
| 3 | $M_{31}; I_{31}$ | / | | $M_{3m}; I_{3m}$ |
| ⋮ | | | | |
| n | $M_{n1}; I_{n1}$ | | | / |

METHOD FOR ANALYZING VIDEO DATA

FIELD OF THE INVENTION

The invention refers to a computer-implemented method for analyzing video data, in particular forensic video data, using a computer program.

PRIOR ART

Video analysis has become a significant forensic resource for investigation processes related to crimes and during court proceedings. For some applications the analysis is based on a watch list with entries of objects of interest, for example persons that are considered as potentially dangerous. Real time surveillance and screening as well as post-event analysis systems working with a watch list of known or un-known identities do only trigger an event (typically an alarm or a request for adjudication) in case a certain threshold of the matching score is reached. However, this is not suited especially for watch-list entries with high priority. Searching the recorded data and showing events in ranked order in turn does result in delays.

Today there are systems in place to monitor constantly and in real time one or more video streams recorded from cameras. The system automatically extracts still images of faces from people visible in the videos based on different criteria's. These pictures are called 'best shots'. In a second step the best shots (or other shots from the video stream) are used as input for a face recognition operation. Each best shot is compared with pictures stored in a watch list. An algorithm does calculate a 'matching score' of how likely the person of the best shot just recorded does match to a person from the watch list.

In case a certain threshold is reached the best shot is added to an alarm list which then may trigger additional actions, which depend on if the watch list is blacklist or a whitelist.

In case all the best shots are stored at any time the operator has the ability to initiate a so called 'reverse search' against a large biometric database. A certain item of the watch list is then compared to all the recorded best shots resulting in an integrated results list if that person has been seen in the incoming video streams based on the best shot storage.

Systems today require a defined threshold in order to generate alarms. In case the quality of the best shot is not sufficient, the matching score against the watch list(s) might not reach the defined threshold even if it should generate a match on a certain identity on the watch list(s). Unfortunately this information is lost as only best shots above the threshold are added to the alarm list.

DESCRIPTION OF THE INVENTION

The invention provides a method for analyzing video data using a computer program according to claim 1. Preferred embodiments are defined in the dependent claims.

Claim 1 is directed to a method of analyzing video data comprising the steps of recording the video data using one or more video recording devices; analyzing at least one video frame of the video data to extract identification information regarding a specific object of interest that is comprised in a watch list of a plurality of objects of interest, the watch list including at least one entry for each of the plurality of objects of interest; computing a matching value by comparing the extracted identification information with predetermined identification information of the specific object of interest; and storing object data and the matching value as an additional entry in the watch list in association with the specific object of interest.

The watch list according to the prior art is expanded to a watch table. Each line (or column) shows object data and a corresponding matching value, for example the highest matching value for one single best shot for each object. With each analyzed at least one video frame (best shot) the table grows line by line (or column by column). The matching value measures a degree of similarity between the extracted identification information and predetermined identification information of the specific object of interest. The predetermined identification information may for example be obtained by an independent previous step of obtaining a high quality image for a known object (person) or may be obtained from the entry in the watch list with the highest matching value.

The method according to the invention may be further developed such that the stored object data comprise at least a part of the video frame and/or metadata of the at least a part of the video frame. Thus, a part of the video frame or the complete video frame may be stored as a representation of the object of interest as identified in the video data. The metadata may include additional information regarding recording of the video data and/or regarding the identified object of interest.

The at least a part of the video frame may comprise an image of the specific object of interest. This allows for a quick overlook of the listed tabulated entries. The image may in particular be a person of interest, more particularly an image of a face of a person of interest.

The metadata may comprise at least one of a recording location, a recording time, and event data related to an event that is associated with the recording location and/or recording time.

The method may further comprise the step of sorting the watch table with respect to the matching values of the entries regarding the specific object of interest, in particular in an order of decreasing matching values of the entries. In this way, an ordered list is obtained for each object of interest in the watch table, in particular with highest matching values at the beginning.

The watch table may have a predefined maximum number of permanent entries for the specific object of interest and in case the maximum number of entries has been exceeded by storing the additional entry, the entry having the lowest matching value is removed from the watch table. Accordingly, a list of up to the maximum number of entries is obtained/maintained. Specifically, the including the highest matching entries up to the maximum number of entries.

The specific object of interest may be a specific person of interest, wherein the stored object data preferably comprises an image of the specific person of interest, more preferably an image of a face of the specific person of interest.

According to a further development, the steps of computing a matching value and storing object data are repeated each time further identification information is extracted for the specific object of interest and/or for each further specific object of interest. In this way, the watch table is updated every time a new identification has been found.

The method may further comprise the step of extracting items from the watch table related to a defined range in recording time and/or a defined region of recording locations. This has the advantage that information regarding an object of interest may be queried from the watch table in correspondence to an event that occurred at a specific time and/or location.

The method may further comprise the step of displaying the location of the one or more video recording devices on a map and for each video recording device the matching value and/or the recording time for the specific object of interest. This provides an overview of the areas where the cameras have recorded the specific object of interest and the related recording times as well as an indication of the quality of the identification based on the matching value.

Moreover, a motion track for the specific object of interest may be displayed on the map. Accordingly, for example the map may display the track of a pedestrian that has been recorded by surveillance cameras or the track of a car on the streets may be shown.

The extraction of identification information may be performed by using at least one of a pattern recognition method and a face recognition method and/or wherein the step of computing a matching value may be performed by using at least one of a pattern recognition method and a face recognition method.

The recording and analyzing, of the video data may be performed continuously, in particular in real time.

The watch table may include a white-list of persons allowed to perform a particular action or a black-list of persons not allowed to perform a particular action.

The predetermined identification information of the specific ojbect of interest may be pre-stored in the watch table.

Further features and advantages of the present invention will be described in the following with reference to the figures, which illustrate only examples of embodiments of the present invention. The illustrated and described features may be suitably combined with each other.

DRAWINGS

EMBODIMENTS

The method of analyzing video data according to an embodiment of e invention comprises the steps of recording video data using one or more cameras; analyzing a frame of the video data to extract identification information regarding a person of interest that is comprised in a watch list of a plurality of persons of interest, wherein the watch list includes at least one entry for each of the plurality of persons of interest; computing a matching value (degree of similarity) by comparing the extracted identification information with predetermined identification information of the specific object of interest; and storing person data and the matching value as an additional entry in the watch list in association with the specific object of interest.

Figure 1:
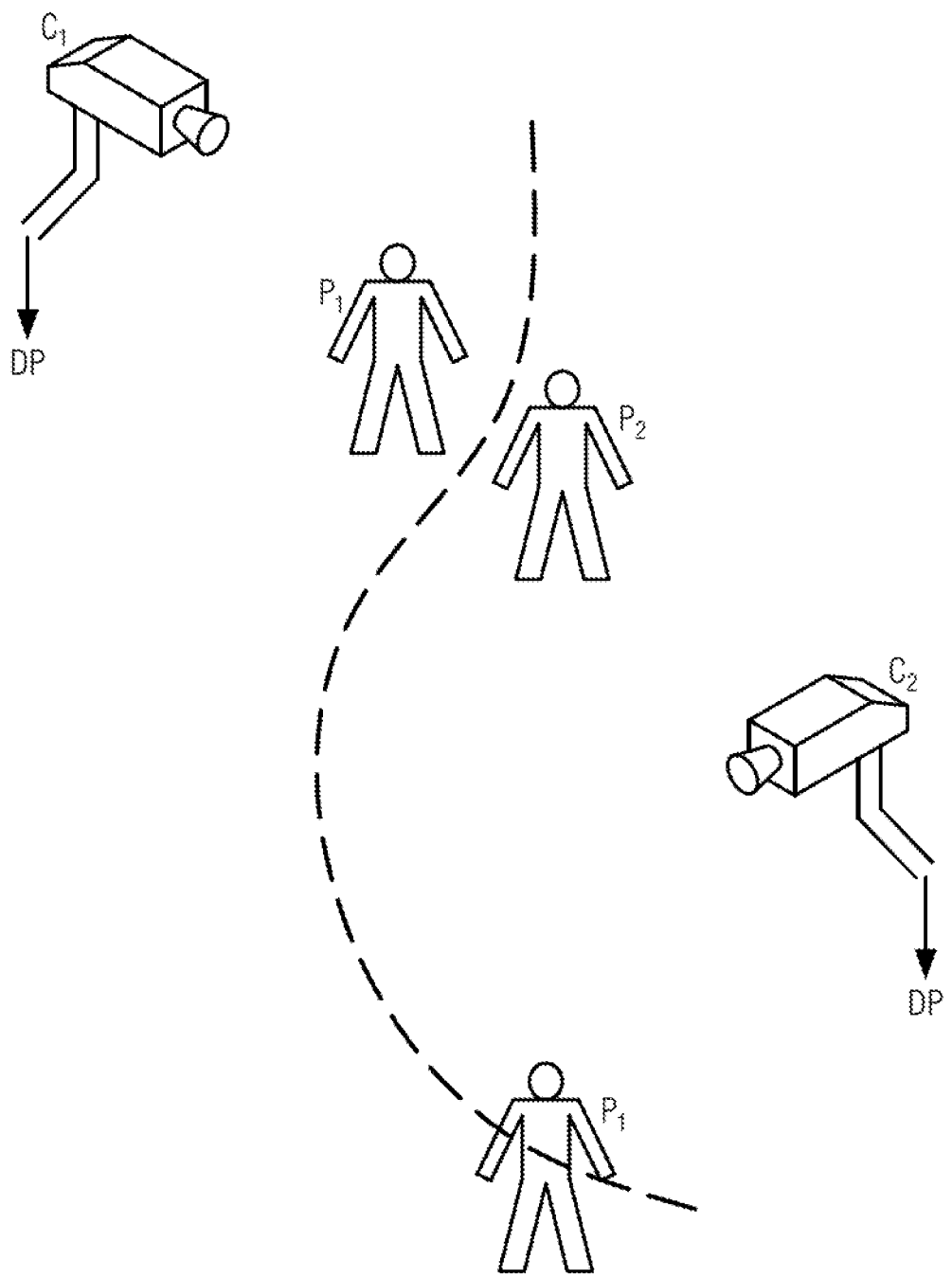
FIG. 1 illustrates recording of video data in an embodiment of the invention.

FIG. 1 illustrates a recording of video data using one or more cameras.

The surveillance cameras $C_1, C_2, \ldots, C_n$ (only $C_1$ and $C_2$ are shown) record video data that include one or more people $P_1, P_2$ for example on public places or streets etc. The recorded video data are transmitted to an observation center with a computer (data processor DP) and an operator for performing an analysis of the video data, preferably in real-time.

Figures 2, 3:
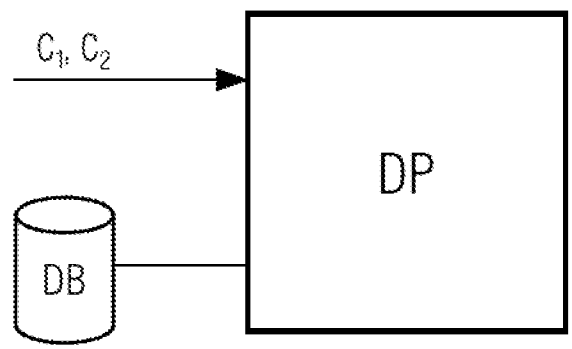
FIG. 2 illustrates the analyzing of the recorded video data in the embodiment of the invention.
FIG. 3 illustrates a watch list according to the embodiment of the invention.

FIG. 2 illustrates the analyzing of the recorded video data in the embodiment of the invention.

The observation center, in particular the data processor DP, receives the video data from the cameras $C_1$ and $C_2$ and it may include a data base DB of persons of interest, such as persons having a record at a law-enforcement agency. The data base DB may include for each person an image of the person, in particular an image of the face of the person, obtained for example during an investigation regarding that person. By using computer-implemented face detection and face analyzing tools or algorithms, characteristic facial features may have been extracted and pre-stored in the data base.

According to this embodiment of the invention the video data are analysed to extract identification information of a person that is visible on one or more frames of the recorded video data, in particular to extract the characteristic facial features of that person. This identification information may be compared with the predefined identification information available in the data base DB. Each time the particular person is identified, a quality of the identification is determined by computing a matching value by comparing the extracted information and the pre-stored/predefined information. The computed matching value and a representative image from a frame of the recorded video data (video streams) are stored in a watch table that is stored in a memory of the data processor DP or in the data base DB.

FIG. 3 shows an example of a watch table according to the invention.

In the watch table, each of the columns refers to an individual person $P_1, P_2, \ldots, P_m$, while the entries for each person are placed in respective row elements, numbered from row index 1 to row index n. The entries for each person $P_1, P_2, \ldots P_m$ include a representative image $L_{ij}$ (so called 'best shot') from the analysed one or more frames and a matching value $M_{ij}$ for this representative image. The entries are sorted for each person in the row direction according to the matching value $M_{ij}$, starting with the entry having the highest matching value (highest similarity to the predefined identification information) and ending with the item having the lowest matching value.

In this example the table may be limited regarding the number of entries in the row direction, such as to a maximum number n of entries (for example a maximum of n=50 entries). In case the table is already filled with the maximum number of entries for a specific person, a new entry is sorted into the respective column for that person in the table and in the location of the row direction corresponding to its matching value, and the entry then having the lowest matching value is removed, in order to keep only the maximum number of entries.

Further, the entries of the watch table may include meta-data regarding the time and location of the recording of the video data, in particular the location and time of recording the best shot (representative image). Based on the meta-data of the watch table other visualization of the identifications are possible, e.g. visualization on a location map of the camera positions, and with what score (matching value) and at what time the watch table item has been matched. This allows an operator of the computer system to quickly to review possible tracks of the individual throughout the observed area (such as the track shown in FIG. 1) and to rule out mismatches etc. Information on how many times a person X was seen by camera $C_1$ and/or which of the cameras $C_1, \ldots, C_n$ have recorded person X may be obtained. Accordingly, the watch table may be used to display a motion track of the person of interest on a map. The identification of a single person recorded on several cameras is simplified through queries on the watch table.

Specifically, for example the route of person X through different areas monitored by cameras (sequence, duration and time) can be followed.

The described embodiments are exemplary and not intended to be limiting. The full scope of the invention is defined in the appended claims.

The invention claimed is:

1. A computer-implemented method of analyzing video data, the method comprising the steps of:
   recording the video data using one or more video recording devices;
   analyzing at least one video frame of the video data to extract identification information regarding a specific object of interest that is comprised in a watch table of a plurality of objects of interest, the watch table including at least one entry for each of the plurality of objects of interest;
   computing a matching value by comparing the extracted identification information with predetermined identification information of the specific object of interest; and
   storing object data and the matching value as an additional entry in the watch table in association with the specific object of interest,
   wherein the watch table has a predefined maximum number of permanent entries for the specific object of interest and in case a maximum number of entries has been exceeded by storing the additional entry, an entry having the lowest matching value is removed from the watch table.

2. The computer-implemented method according to claim 1, wherein the stored object data comprises at least one selected from the group of (i) at least a part of the video frame and (ii) metadata of the at least a part of the video frame.

3. The computer-implemented method according to claim 2, wherein the at least a part of the video frame comprises an image of the specific object of interest.

4. The computer-implemented method according to claim 2, wherein the metadata comprise at least one selected from the group of (i) a recording location, (ii) a recording time, and (iii) event data related to an event that is associated with at least one selected from the group of (a) the recording location and (b) the recording time.

5. The computer-implemented method according to claim 1, further comprising the step of sorting the watch table with respect to the matching values of the entries regarding the specific object of interest in an order of decreasing matching values of the entries.

6. The computer-implemented method according to claim 1, wherein the specific object of interest is a specific person of interest, and wherein the stored object data comprises an image of a face of the specific person of interest.

7. The computer-implemented method according to claim 1, wherein the steps of computing a matching value and storing object data are repeated each time further identification information is extracted for at least one selected from the group of (i) the specific object of interest and (ii) each further specific object of interest.

8. The computer-implemented method according to claim 1, further comprising the step of extracting items from the watch table related to at least one selected from the group of (i) a defined range in recording time and (ii) a defined region of recording locations.

9. The computer-implemented method according to claim 1, further comprising the step of displaying the location of the one or more video recording devices on a map and, for each video recording device, at least one selected from the group of (i) the matching value and (ii) the recording time for the specific object of interest.

10. The computer-implemented method according to claim 9, wherein a motion track for the specific object of interest is displayed on the map.

11. The computer-implemented method according to claim 1, wherein at least one selected from the group of (i) the extraction of identification information is performed by using at least one selected from the group of (a) a pattern recognition method and (b) a face recognition method and (ii) the step of computing a matching value is performed by using at least one selected from the group of (a) a pattern recognition method and (b) a face recognition method.

12. The computer-implemented method according to claim 1, wherein the recording and analyzing of the video data is performed continuously in real time.

13. The computer-implemented method according to claim 1, wherein the watch table includes at least one selected from the group of (i) a white-list of persons allowed to perform a particular action and (ii) a black-list of persons not allowed to perform a particular action.

14. The computer-implemented method according to claim 1, wherein the predetermined identification information of the specific object of interest is pre-stored in the watch table.

15. The computer-implemented method according to claim 3, wherein the metadata comprise at least one selected from the group of (i) a recording location, (ii) a recording time, and (iii) event data related to an event that is associated with at least one selected from the group of (a) the recording location and (b) the recording time.

16. The computer-implemented method according to claim 2, further comprising the step of sorting the watch table with respect to the matching values of the entries regarding the specific object of interest in an order of decreasing matching values of the entries.

17. The computer-implemented method according to claim 3, further comprising the step of sorting the watch table with respect to the matching values of the entries regarding the specific object of interest in an order of decreasing matching values of the entries.

18. The computer-implemented method according to claim 4, further comprising the step of sorting the watch table with respect to the matching values of the entries regarding the specific object of interest in an order of decreasing matching values of the entries.

19. A computer-implemented method of analyzing video data, the method comprising the steps of:
   recording the video data using one or more video recording devices;
   analyzing at least one video frame of the video data to extract identification information regarding a specific object of interest that is comprised in a watch table of a plurality of objects of interest, the watch table including at least one entry for each of the plurality of objects of interest;
   computing a matching value by comparing the extracted identification information with predetermined identification information of the specific object of interest; and
   storing object data and the matching value as an additional entry in the watch table in association with the specific object of interest,
   wherein the stored object data comprise at least one selected from the group of (i) at least a part of the video frame and (ii) metadata of the at least a part of the video frame, wherein the watch table has a predefined maximum number of permanent entries for the specific object of interest and in case a maximum number of entries has been exceeded by storing the additional entry, an entry having the lowest matching value is removed from the watch table.

* * * * *